INVENTORS
SOL GREENBERG
GEORGE GAUTHERIN
BY
MORGAN, FINNEGAN, DURHAM & PINE
ATTORNEYS

INVENTORS
SOL GREENBERG
GEORGE GAUTHERIN
BY
MORGAN, FINNEGAN, DURHAM & PINE
ATTORNEYS

United States Patent Office 3,387,201
Patented June 4, 1968

3,387,201
REGULATED POWER SUPPLIES INCLUDING INVERTER CIRCUITS
Sol Greenberg, Roslyn, and George Gautherin, Woodside, N.Y., assignors to Lambda Electronics Corporation, Huntington, N.Y., a corporation of New York
Filed Apr. 1, 1965, Ser. No. 444,577
18 Claims. (Cl. 321—2)

ABSTRACT OF THE DISCLOSURE

A regulated power supply including two channels each of which has first and second controlled rectifiers and tandem combinations of LC circuits. The first controlled rectifiers in each channel charge capacitors in sequence after which the capacitors are discharged through the primary windings of an output transformer and the second controlled rectifiers in each channel, the controlled sequential charging and discharging being effective to provide an AC output at the transformer secondary winding. This output is rectified and appears as a DC output voltage. The pulses generated within the two channels are controlled as to amplitude and duration to provide a closely controlled voltage at the output terminals. A detection circuit is connected across the DC output terminals to feed an error signal representative of amplitude deviations from a desired level back to trigger circuits which control firing of the controlled rectifiers. The AC portion of the apparatus operates at a relatively high frequency to minimize the size and weight of the inductive components in the system. The controlled rectifiers and the output transformer provide good isolation between the AC and DC portions of the system.

---

Figure 1:
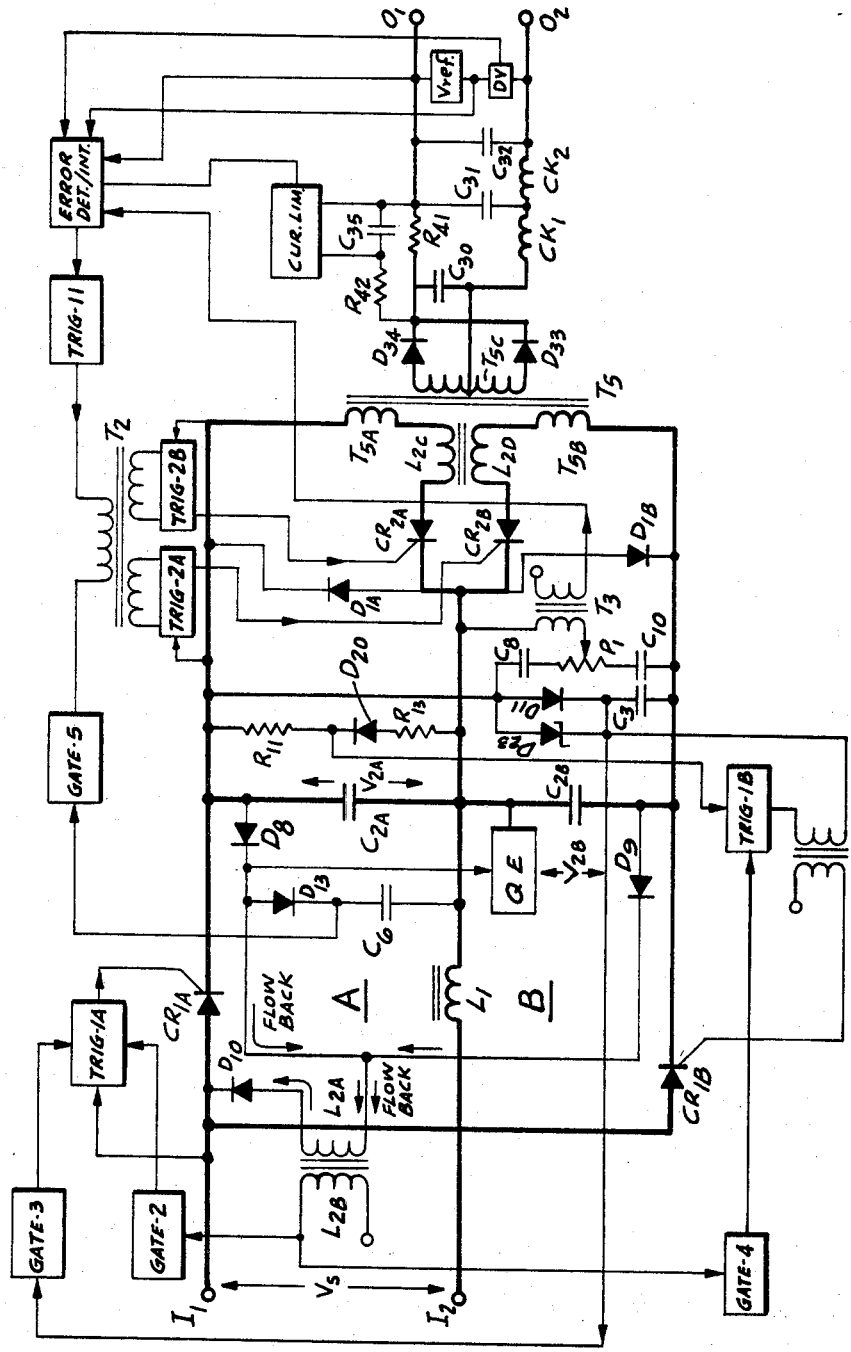

This invention relates to switching type regulated power supplies and more particularly to switched inverter circuits in such supplies. The invention is especially applicable to supplies which, while capable of delivering kilowatts of regulated power, nevertheless occupy relatively small space and are relatively light in weight.

There has been an extensive effort in the regulated power supply art to increase the power handling and regulating capacity of the supply per unit of volume and unit of weight. In meeting this requirement, the art has found it necessary in many cases to seek substitutes for heretofore adequate electronic components, e.g., power transistors.

To effectively deliver and control large values of power, the art has adopted certain switching techniques and, in several instances, the use of controlled rectifiers as the switched elements. Although these units have high power capabilities, they are burdened by the same disadvantages which characterize thyratron vacuum tube units, namely, the difficulty of providing effective turn-off or cut-off after the rectifier has been energized. Apart from this difficulty, there is also a lack of efficient and precise control over the power transfer operation.

An effective power control circuit which provides efficient and precise control of power flow and which provides an effective technique for commutating controlled rectifiers is disclosed in applicants' copending application, Ser. No. 360,229, filed Apr. 16, 1964, for Regulated Power Supplies, and assigned to the assignee of the instant application. The present invention is related to the techniques disclosed in said copending application and is more particularly directed towards the application and modification of such techniques to a highly efficient power supply which employs an inverter circuit as part of the overall regulated system. The use of this inverter arrangement provides improvements in efficiency; it facilitates the elimination of the input transformer which is heavy and bulky and permits its replacement by a substantially smaller and lighter transformer at the output side of the inverter. As a result a high ratio of power per unit of volume and weight is achieved and this is accomplished without restricting the range of operation. In addition, full isolation of both load and line, and isolation with respect to AC and DC flow are provided.

Through the elimination of problems associated with magnetizing current, a high operating frequency of the supply can be maintained, resulting in a further reduction in component weight and volume. In addition, the supply may be maintained over a wide range of operation at an essentially constant control frequency thus affording a number of advantages not the least of which is effective current limiting. By reason of width and amplitude modulation techniques within the inverter together with an arrangement for providing non-dissipative flow back control of power flow, a high efficiency is realized. This efficiency is further promoted because the commutation techniques permit the transfer of magnetizing current energy to the load. The commutation technique together with the amplitude and width control provides a wide range of output power including an essentially zero power condition; and the system, except for internal losses, is capable of delivering the maximum source power to the load.

It is accordingly among the objects of the invention to achieve the foregoing characteristics and thus to provide a regulated power supply which has improved efficiency, regulation, high power capabilities and minimum size and weight.

Other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, processes, combinations, arrangements and improvements herein shown and described.

Figure 2:
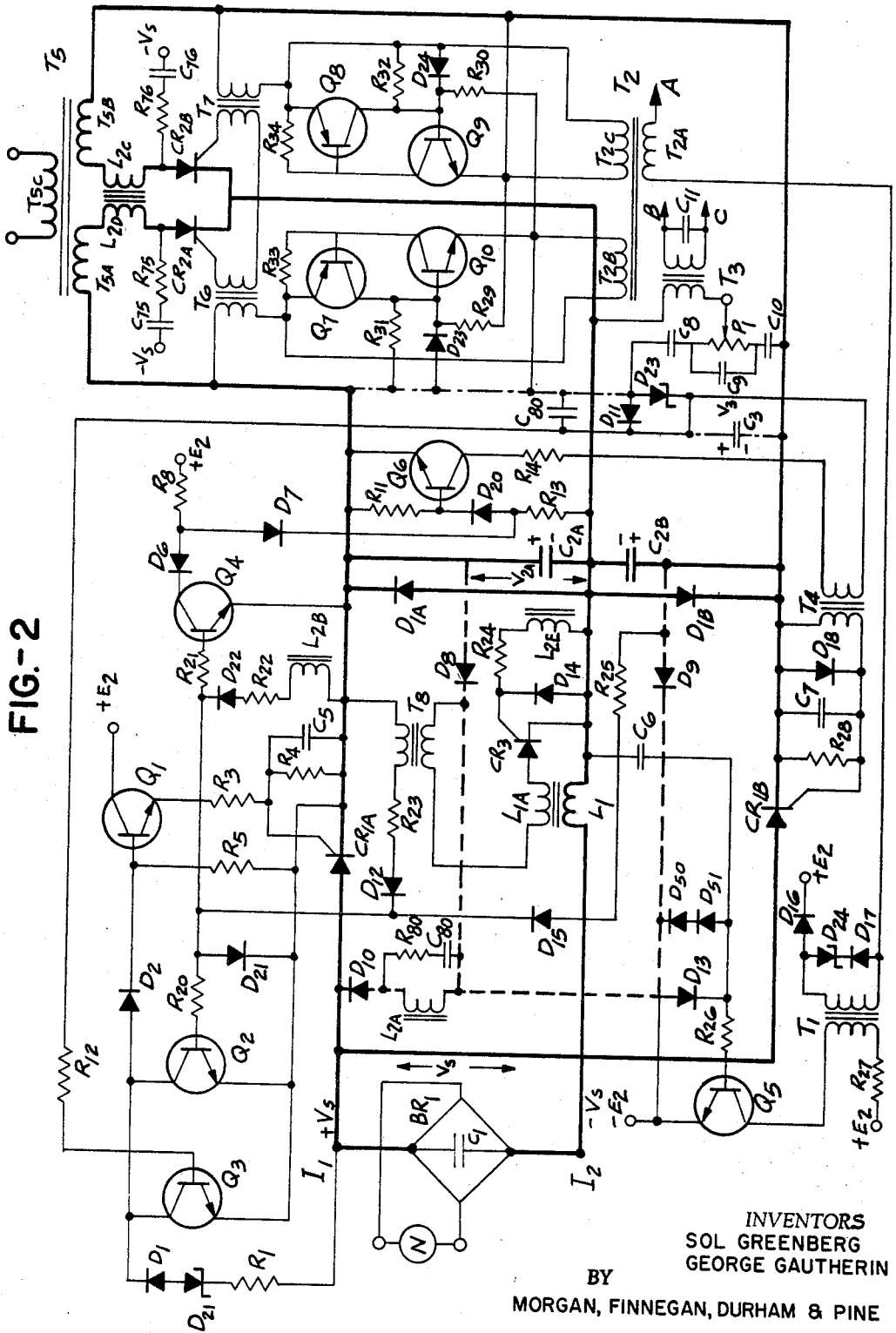
Figure 3:
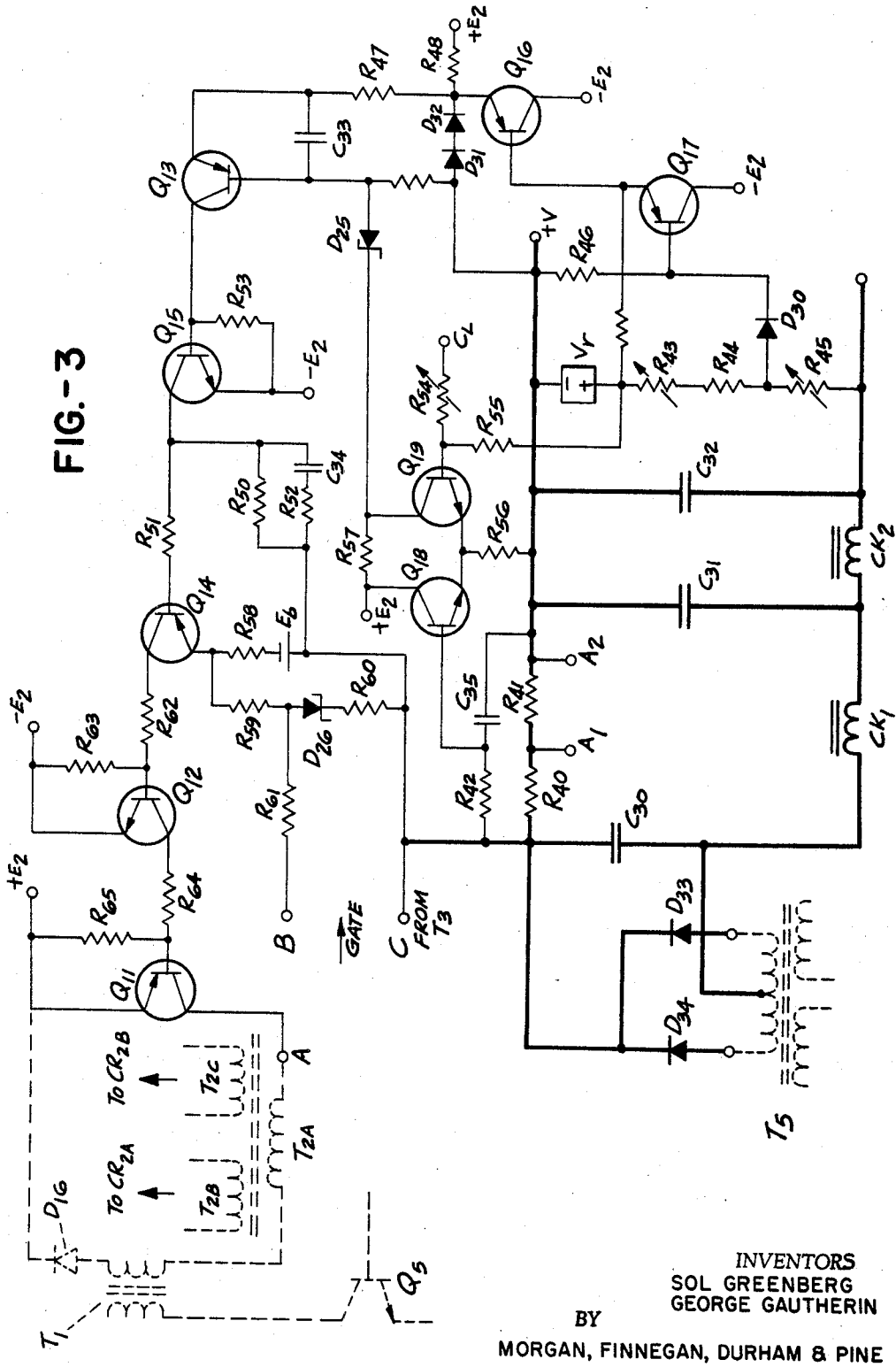

Serving to illustrate exemplary embodiments of the invention are the drawings of which:

FIGURE 1 is a schematic diagram of a regulated DC supply in accordance with the invention; and FIGURES 2 and 3 are schematic diagrams illustrating additional circuit details of the arrangement of FIGURE 1.

To facilitate an understanding of the invention, the principal power flow circuit in the inverter part of the supply in FIGURE 1 is shown in heavy lines. That circuit is energized from terminals I1, I2 with a DC voltage $V_s$ derived from a rectifier-filter combination powered directly from the line. The voltage $V_s$ energizes two channels each of which includes the tandem combination of LC circuits having controlled rectifiers therein. One channel has a rectifier CR1A which is connected to charge a capacitance C2A, the return side of which is connected to input terminal I2 via an inductance L1. The second LC circuit cascaded to the first just described, comprises the series combination of a winding T5A and a controlled rectifier CR2A, which combination is connected across C2A.

The second channel includes an analogous arrangement. A first switched LC circuit embodies a controlled rectifier CR1B, capacitance C2B and the common inductance L1. Connected across C2B is the second switched circuit comprising the series combination of a winding T5B and a controlled rectifier CR2B.

As described more fully hereinafter, controlled current pulses flow in the windings T5A and T5B hereby inducing an AC voltage in the secondary winding T5C. A full wave rectifier having diodes D33 and D34 is connected to T5C to provide a rectified voltage across input filter capacitance C30. This rectified voltage is subject to further filtering by way of a choke CK1, filter capacitance C31, choke CK2, and filter capacitance C32, thereby providing a filtered DC output voltage across output terminals O1, O2.

Connected across the output terminals is the serial combination of a reference voltage source and an adjustable divider DV. Departures in the output voltage are sensed in this arrangement and fed to an error detector and integrator. The average error signal is fed via gate circuits described hereinafter to a trigger transformer T2, the output of which controls the firing of the controlled rectifiers CR2A and CR2B in such a manner as to reduce any error and maintain the output voltage or current at its selected value.

A typical sequence of events starts with the firing of CR1A due to the receipt of a trigger signal at its gate. For ease of explanation, the overall duty cycle is regarded as composed of eight quadrants with the triggering of CR1A assigned to the first quadrant. This trigger signal is generated in a trigger circuit 1A provided the source voltage $V_s$ is of sufficient amplitude and provided certain gating conditions exist as described more fully hereinafter. The triggering of CR1A causes $V_s$ to charge C2a via L1. The resultant voltage V2A rises toward a value approaching about twice $V_s$. During this period, which embraces the first and second quadrants, the charging current rises to a maximum and then decays towards zero.

As V2A reaches its peak, C2A commences to discharge, initially cutting off CR1A and then flowing through an essentially non-dissipative flow back circuit to the source. This commences in the third quadrant. The flow back circuit includes diode D8, winding L2A and diode D10. As flow back continues the charge on C2A decreases. This charge is monitored by a circuit comprising diode D13 and capacitance C6 which circuit is connected across the combination of D8 and C2A. This monitoring signal, indicative of the instantaneous charge on C2A, is fed via gate circuit 5 to the primary of the trigger transformer T2. The transformer is also fed by an error signal reflecting the correction required to maintain the output at a constant magnitude. When there is proper coincidence between the charge on C2A—which charge is a measure of the available energy—and the error signal, the controlled rectifier CR2A is fired via the trigger circuit 2B. This occurs early or late in the third quadrant for heavy and light loads, respectively. When CR2A fires, the residual charge on C2A is discharged through the winding T5A of transformer T5. This produces a pulse in the secondary winding T5C which is rectified and delivered to the output. Although C2A is fully discharged near the end of the fourth quadrant, CR2A continues to conduct through the fifth and sixth quadrants thereby delivering the circuit's stored inductive energy as well to the output.

When C2A has been discharged below a predetermined amount a trigger circuit 1B is activated causing a trigger signal to be applied via trigger transformer T4 to CR1B in the B channel. When this occurs CR1B fires charging C2B to its peak value at the end of the sixth quadrant. Thereafter, during the seventh quadrant, C2B discharges, initially cutting off CR1B and then returning current to the source via a flow back circuit comprising diode D9 and the previously mentioned components L2A and D10. It may be seen that this action is similar to the action which occurs in the A channel. The return of current to the source via L2A in the flow back path causes a voltage to be induced in L2C of a magnitude and polarity to insure cut-off of CR2A in the A channel.

In like manner with the A channel operation, a trigger signal from trigger circuit 2A fires CR2B when the charge on capacitor C2B, as monitored by D13 and C6, corresponds with a control signal fed to transformer T2 calling for correction of the output current or voltage. With this correspondence, which occurs in the seventh quadrant, CR2B is triggered whereupon C2B discharges through winding T5B on transformer T5. The resultant pulse of current coupled through T5 is in push-pull relationship relative to the pulse obtained from channel A and is rectified to supply the output circuit. The pulse may continue to flow beyond the eighth quadrant due to the inductive action of the circuit. Current flow through L2A due to flow back in the A channel causes a cut off voltage to be induced in L2D whereby CR2B is cut off.

It may be seen that the transformer is energized in a balanced manner and it is also apparent that the magnetizing current is transformed to useful output energy. The operating frequency of the inverter circuit may be relatively high, e.g., 5 kc. Hence, transformer T5 may be considerably smaller and lighter than an input transformer operating off the mains. It should also be noted that the open circuit action of CR2A and CR2B supplements the isolation provided by T5 to provide both AC and DC isolation. Also, the absence of a DC component in the primary of T5 eliminates the limitation on high frequency operation which would otherwise exist.

Under certain conditions associated with small loads, voltage V2A tends to discharge to a minimum value above zero. This condition is related to the tendency of V2A to oscillate around a level equal to $V_s$. To eliminate this tendency, a Q enhancing circuit QE is employed, the details of which will be described more fully hereinafter. This circuit is connected across the combination of C2A and diode D8, and the combination C2B and D9.

Q ENHANCING CIRCUIT

In the following discussions reference may be had to FIGURES 2 and 3 which illustrate further details of certain of the circuits shown in FIGURE 1.

The Q enhancing circuit is connected across C2A via D8 and across C2B via D9. It includes one winding of transformer T8, a winding L1A which is coupled to winding L1, and a controlled rectifier CR3. These elements are serially interconnected across C2A and serve to provide a controlled path for the complete discharge of C2A during the fourth quadrant of operation. At the beginning of this quadrant V2A is discharged to a value which approximates $V_s$ and when this occurs L2A in the flow back circuit acts like a generator causing a voltage to be induced in a winding L2E coupled thereto. This winding L2E together with a serially-connected resistance R24 is connected across the cathode-gate circuit of CR3 and the polarity of voltage induced in L2E causes CR3 to be energized. Consequently, the Q enhancing circuit is completed, thus enabling C2A to continue to discharge through D8, T8, L1A and CR3. This discharge is transferred to the source via winding L1 and hence the action is essentially non-dissipative. Note that except for light loads, flowback will not persist into the fourth quadrant and hence the Q enhancing circuit will remain passive.

CR1A TRIGGER CIRCUIT

Connected between the positive side of source $V_s$ and the base of a transistor Q1 is a circuit comprising the serial combination of resistance R1, Zener diode DZ1 and diodes D1 and D2. From the base of Q1 to the cathode side of CR1A is a resistance R5. It may be seen from this circuit, that when there is a sufficient differential voltage across CR1A, Zener diode DZ1 is fired causing base-emitter current to flow in stage Q1. The resultant collector-emitter current causes the triggering of CR1A since the emitter of Q1 is connected to the gate of CR1A via resistance R3. The voltage $+E2$ applied to the collector of Q1 is derived from an auxiliary source which is not shown.

In the third quadrant of operation the polarity of voltage across winding L2A is such as to prevent the re-ignition of CR1A. However, this voltage reverses polarity in the fourth quadrant and CR1A could, therefore, fire in the presence of spurious gate signals. To prevent this, a gate circuit is provided which includes a winding L2B coupled to winding L2A. When the polarity of voltage across the latter reverses, the voltage induced in L2B is applied via resistance R22, diode D22 and resistance R20 to the base-emitter circuit of a clamping or gating stage Q2. This voltage causes Q2 to be switched on. The collector-emitter circuit of Q2 is connected in the base circuit of Q1 between the junction of D1 and D2, and the cathode side of CR1A. In effect, then, the input to the trigger Q1 is short circuited, preventing the application of spurious trigger signals to CR1A.

An additional gating stage Q3 has its collector-emitter circuit connected in parallel with the corresponding circuit of stage Q2. The base of Q3 is connected via resistance R12 to the junction of a diode D11 and a capacitance C3, this combination being serially connected across the combination of C2A and C2B. During the conduction of CR1A, capacitance C3 is charged via D11 and C2B. When CR1A ceases conduction, C3 commences to discharge via R12, the base-emitter of Q3, C2A and C2B. Hence Q3 is switched on thereby short-circuiting the base-emitter circuit of Q1 during the third and fourth quadrants. In the region of the beginning of the fifth quadrant, the voltage across C3 passes through zero and C3 commences to charge to the voltage of the opposite polarity. The charging current flows through the base-emitter circuit of Q3. Hence it may be seen that Q3 operates as a gate during the fifth and sixth quadrants as well as the third and fourth quadrants while Q2 serves as a gate throughout the fourth quadrant.

During the fifth, sixth, seventh and eighth quadrants, Q2 is activated to maintain Q1 disabled by way of a circuit connected to the junction of R20 and D21, and comprising the serial combination of diode D15 and resistance R25. The resultant current flow in the base-emitter circuit keeps Q2 energized to thereby prevent the firing of CR1A. The diode D21 is connected between D15 and the emitter of Q2 to provide an alternate discharge circuit. The overlap in the gating function of Q2 and Q3 provides a safety feature.

CR1B GATING AND TRIGGERING

The gate-cathode circuit of CR1B includes resistance R28, capacitance C7, diode D18 and the secondary of transformer T4 all connected in parallel between the gate and cathode. The primary of trigger transformer T4 has one side connected via resistance R14 to the collector of trigger stage Q6, the emitter of which is tied to the cathode leg of CR1A. The other side of the T4 primary is connected via a Zener diode DZ3 to this same branch. During quadrants 1 through 4 there is a positive voltage across C2A and this condition results in the back-biasing of Q6 since the base of Q6 is connected to a series circuit R13, D20, and R11 connected across C2A.

Following the fourth quadrant, V2A is near zero and hence Q6 is switched into the conductive state via current flow from source +E2 through resistance R8, diode D7 and diode D20 to the base of Q6. When Q6 is switched on, a current may flow through the primary of T4. This current is derived from the charge stored on capacitance C3, which charge was stored on C3 during the conduction of CR1A. During the third and fourth quadrant following the cut-off of CR1A, C3 discharges until the voltage V3 falls below the breakdown voltage of DZ3. This value of residual voltage remains stored on C3 until the fifth quadrant when Q6 is energized as hereinbefore described. C3 may then discharge through the primary of T4, resistance R14 and the collector-emitter circuit of Q6. The resultant voltage induced in the secondary T4 triggers CR1B. Self-commutation of CR1B occurs at the end of the sixth quadrant in the same way that CR1A automatically cuts off at the end of the second quadrant. Following the conduction of CR1B, C3 completely discharges and charges in the opposite direction. Hence, there is no need to gate or clamp the trigger circuit of CR1B during the seventh and eighth quadrant as is necessary in the case of CR1A during the third and fourth quadrant.

In the eighth quadrant and assuming a small load, the polarity reversal across L2E activates the Q damping circuit causing C2B to fully discharge therethrough in a manner analogous to the discharge of C2A under like conditions in the fourth quadrant.

As noted previously, base-emitter current for the gate stage Q6 is derived from source E2 and flows from +E2 through R8, D7, D20, the base-emitter of Q6 and thence via D8 to —E2. However, during the intervals between the third and fourth quadrant and the seventh and eighth quadrant, the voltage induced in winding L2B, which voltage actuates gating stage Q2 as noted above, also serves to actuate a stage Q4 via R22, D22 and resistance R21. When Q4 is thus switched on, base-emitter current is diverted from Q6 preventing the triggering of CR1B during the fourth and eighth quadrant.

TRIGGERING OF CR2A AND CR2B

The firing of the succeeding CR stages CR2A and CR2B in each channel depends upon whether or not the output requires correction. Assuming it does, and referring to FIGURE 3, an error signal is sensed by the stage Q17. A departure in output voltage from the adjusted value causes a difference voltage to be applied between the base and emitter of Q17. Collector-emitter current varies accordingly causing an amplified signal to appear at the base of Q16 which is connected in emitter-follower relationship relative to Q17. The output is taken from the emitter of Q16 and applied to a network which includes resistance R47 and capacitance C33 constituting a noise filtering arrangement. The resultant signal is amplified by stages Q13 and Q15 and applied to an integrating network comprising R52 and C34 in series relationship and a resistance R50 shunting both. The error signal, now integrated is then applied by a resistance R51 to the base-emitter circuit of a stage Q14. This stage is gated between conduction and cut-off by a signal which is derived from the inverter circuit.

Referring back to FIGURE 2 it may be noted that there is connected across the inverter the series combination of capacitance C8, potentiometer P1 and capacitance C10. A capacitance C9 shunts P1 while the arm thereof is connected to the primary of transformer T3 whose other end is returned to the common leg of the inverter circuit. The secondary winding of T3 has a voltage induced therein which alternates in synchronism with inverter operation and this voltage appears across points B–C. As shown in FIGURE 3, these points are connected to a network comprising resistance R61, diode DZ6 and resistance R60. The polarity of the voltage thus applied between B and C is of such a magnitude as to overcome the cut-off bias E$b$ in the emitter circuit of Q14 during the third and fourth quadrant. Hence, during this interval the average error signal is coupled through Q14 to the succeeding transistor stage Q12. Stage Q12 is thereby energized causing the switching on of Q11. The amplified and averaged error signal thus appears in the emitter-collector circuit of Q11 provided the collector circuit is completed and is supplied with an energizing voltage. Referring back to FIGURE 2, it is seen that point A passes through the primary T2A of trigger transformer T2 and thence through the secondary winding of T1 and a diode D16 back to the +E2 terminal. Accordingly, for emitter-collector current to flow in Q11 in proportion to the average error signal, a voltage must be supplied across the secondary of transformer T1.

As seen in FIGURE 2, the primary of T1 is connected in series with resistance R27 and the collector-emitter circuit of a stage Q5, this combination being connected between +E2 and −E2. The base of Q5 is connected via resistance R26 to capacitance C6. C6 is charged during the first and second quadrant via the conduction of CR1A the charging path comprising diode D8, diode D13, C6 and L1. The drop across diode D13 is such as to back-bias Q5. At the beginning of the third quadrant however, Q5 is rendered conductive as C6 discharges. Thus, a voltage is induced in the secondary of T1 and assuming an error signal at the base of Q11, there is a coincidence which causes a pulse of current to flow through the primary of T2A. Hence trigger pulses are induced into windings T2B and T2C.

The trigger signals in T2B and T2C are coupled via trigger stages Q7, Q10 and Q8, Q9, respectively, to respective trigger transformers T6 and T7. If there is a voltage across C2A, which is the case in quadrants 1 through 4, then Q10 is back-biased because of the current flow through diode D23 and resistance R29. With Q10 disabled, the voltage induced in T2B causes a current flow through the primary of winding T6 whereupon a trigger signal is applied to CR2A. During the fifth through eighth quadrant however, Q10 is energized because of the voltage across C2B and hence the primary of T6 is short circuited. During this interval CR2A may not be energized.

An analogous arrangement applies with respect to CR2B in channel B. During the fifth through eighth quadrants, Q9 is back-biased and thence the signal induced in transformer T2C causes a trigger current to flow through the primary of T7. Rectifier CR2B is thus switched on. Conduction of Q9 in quadrants one through four prevents the switching on of CR2B during this interval.

As noted hereinbefore, flowback in one channel induces a cut-off voltage in the other; the alternating conduction of CR2A and CR2B causes an alternating voltage to be induced in the secondary winding T5C. This voltage is rectified to supply the load.

In the study and practice of the invention, modifications will undoubtedly occur to those skilled in the art. The invention is accordingly not to be limited to the specific mechanisms shown and described but departures may be made therefrom within the scope of the accompanying claims.

What is claimed is:

1. A regulated DC power supply comprising a source of DC power, an inverter circuit connected thereto, said inverter circuit including push-pull channels each channel comprising an isolating circuit and an oscillatory self-commutating circuit having controlled rectifier means and load-supplying reactance charged from said source via said rectifier means; a DC output circuit including a rectifier; said isolating circuit of each channel including transformer means connected to said rectifier circuit for transforming the charge of the respective load-supplying reactance to supply said output circuit, and controlled power-carrying switch means connected to controllably transfer charge of said reactance to the respective transformer means; and regulating means connected between said output circuit and said inverter circuit for controlling said inverter circuit to provide a regulated DC output.

2. A power supply as defined in claim 1 in which said reactance includes the series combination of inductance and capacitance.

3. A power supply as defined in claim 1 in which said transformer means includes a primary winding in each channel connected via the respective power-carrying switch means to the respective reactance.

4. A power supply as defined in claim 1 including flowback means in said inverter circuit for returning controlled amounts of energy stored in said reactance to said source.

5. A regulated power supply comprising a source of relatively unregulated DC voltage, an output circuit, a transformer circuit for supplying said output circuit, an inverter circuit comprising a pair of push-pull channels each having first and second controlled rectifier circuits in cascade between said source and said transformer circuits, said first-circuit controlled rectifier means being effectively connected in isolated relationship with respect to said output circuit and each controlled rectifier circuit including controlled rectifier means and cut off means for causing automatic cut off of the respective controlled rectifier means; feedback control circuit means operatively connecting said output circuit and said rectifier circuits and having actuating means for rendering said rectifier circuits successively conductive as a function of the condition of said output whereby regulation is attained.

6. A power supply as defined in claim 5 in which said first controlled rectifier circuit includes means for recurrently storing time-varying energy and said second controlled rectifier circuit includes means responsive to said output for transferring said energy to said output circuit when it attains a requisite level.

7. A power supply as defined in claim 6 in which said first controlled rectifier circuit of each channel includes means providing a controlled flowback of energy from said first controlled rectifier circuit to said source to thereby control said time-varying energy.

8. A power supply comprising a source of relatively unregulated DC potential, a pair of push-pull circuits each having a power storage circuit energized from said source and each having means for recurrently storing energy and means for returning controlled amounts of said energy to said source for developing a respective pulse of energy having a time-varying amplitude and variable width; an output circuit including a transformer for delivering an output; and regulating means coupled to said output circuit and push-pull circuits for controlling said return of energy to said source.

9. A supply as defined in claim 8 in which said regulating means include a feedback control circuit for controlling the start of energy transfer to said output circuit as a function of output conditions to thereby deliver an amount of energy to said output which is controlled as a function of said conditions.

10. A supply as defined in claim 9 in which said feedback control circuit includes control means for monitoring the instantaneous magnitude of said stored energy relative to said output.

11. A power supply as defined in claim 9 including a power transfer circuit in each push-pull circuit, said transfer circuit comprising isolating means for rendering said storage circuit load insensitive and for supplementing the isolation provided by said transformer.

12. A power supply as defined in claim 9 in which said storage circuits include capacitances for storing said energy and rendering said storage circuits self-commutative, said capacitances being connected to deliver cut-off power in isolated relationship relative to said output circuit.

13. A power supply inversion method for converting DC to regulated AC comprising the steps of transferring a first predetermined minimum amount of energy from a DC source to storage means, causing the flowback of said transferred energy to said source until the residual energy in said storage means reaches a desired level, re-routing said energy flow to transformer means, transferring a second predetermined minimum amount of energy from said source to storage means, causing the flowback of said second transferred energy to said source until the residual stored energy reaches a desired level, and re-routing said second energy flow to said transformer means in alternation with said first re-routed energy flow to generate regulated AC power.

14. A method as defined in claim 13 including the step of sampling the instantaneous value of said stored energy as well as load conditions, and terminating said flowback in accordance with a predetermined relationship between said sampled energy and load condition.

15. A method as defined in claim 13 in which said transfer and flowback is effected by shock excitation of an underdamped oscillatory circuit.

16. A power supply comprising means for converting DC potential to recurrent controlled energy pulses, means connected to said converting means for controlling the peak amplitude and width of said pulses while maintaining the repetition rate thereof substantially constant, and means fed by said pulses for translating said pulses into an AC signal.

17. A power supply as defined in claim 16 including transformerless rectifier means energized from an AC source for generating said DC potential and wherein said repetition rate is substantially higher than the frequency of said source.

18. A power supply as defined in claim 16 in which said translating means comprise balanced transformer means fed by said pulses in push-pull fashion.

References Cited

UNITED STATES PATENTS

| | | | |
|---|---|---|---|
| 3,323,076 | 5/1967 | Pelly | 331—117 |
| 3,327,199 | 6/1967 | Gardner et al. | 321—2 |

JOHN F. COUCH, *Primary Examiner.*

WARREN E. RAY, *Examiner.*

W. H. BEHA, *Assistant Examiner.*